Figure 5:
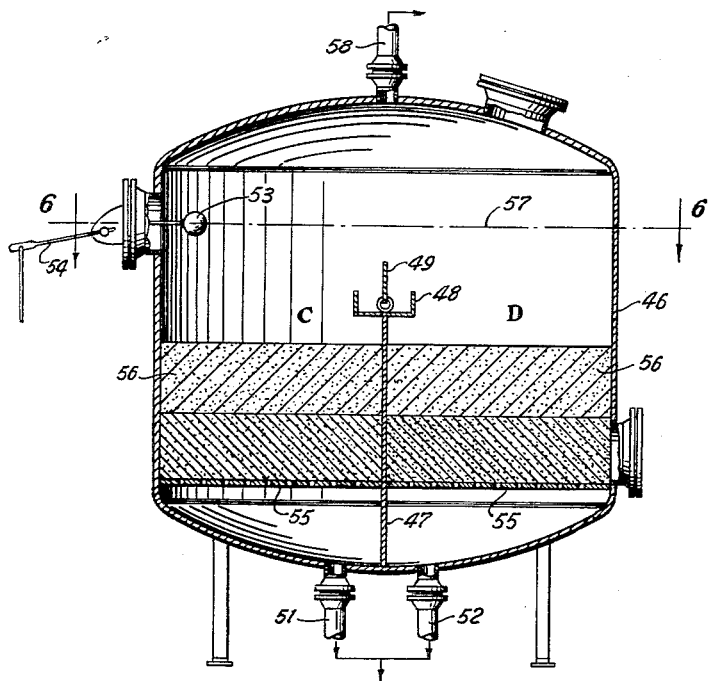

May 3, 1960 W. L. DUNN 2,935,195
WATER FILTERS
Filed Nov. 13, 1956 2 Sheets-Sheet 1
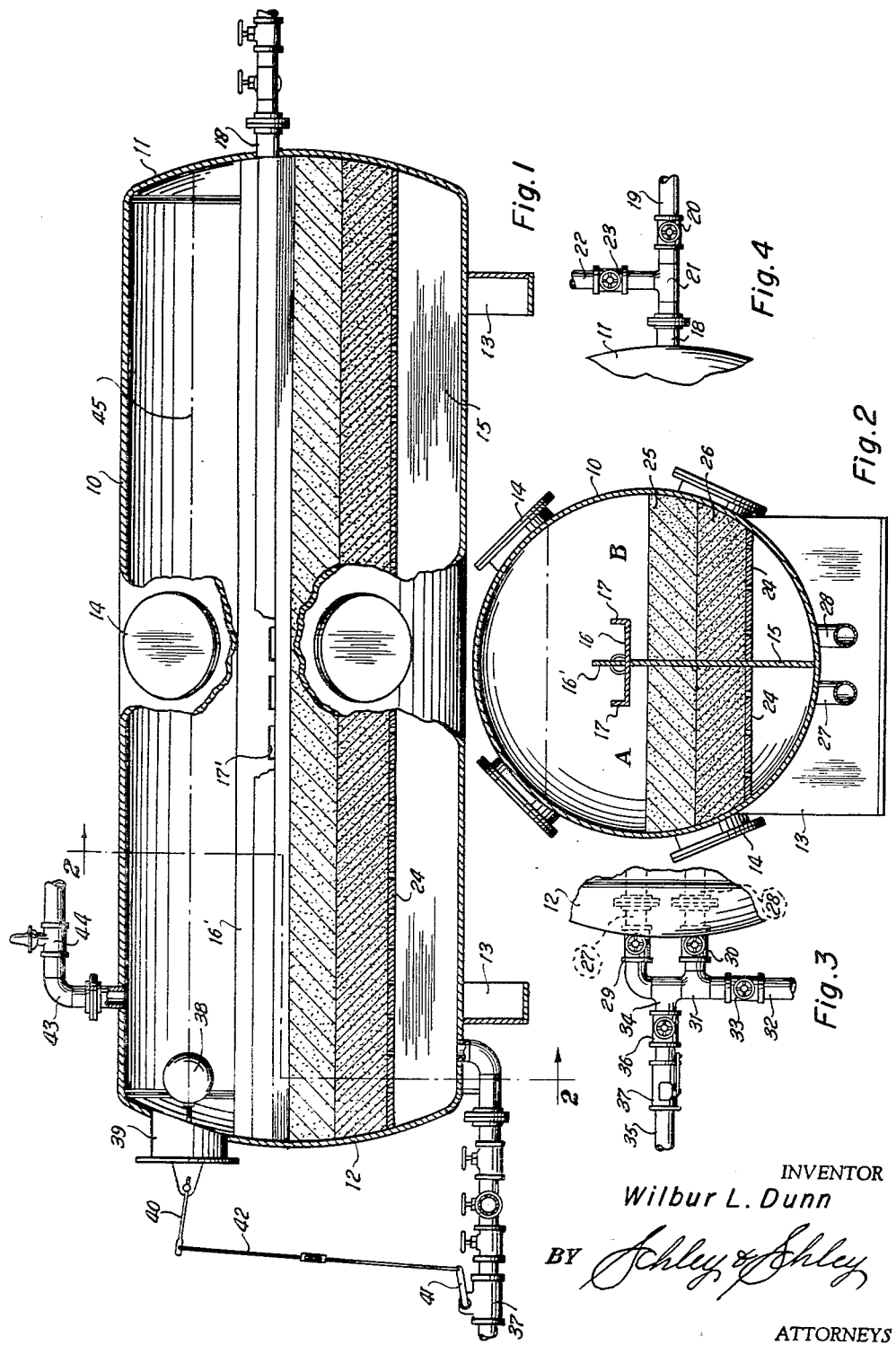
INVENTOR
Wilbur L. Dunn
BY Schley & Schley
ATTORNEYS May 3, 1960 W. L. DUNN 2,935,195
WATER FILTERS
Filed Nov. 13, 1956 2 Sheets-Sheet 2

INVENTOR
Wilbur L. Dunn

BY Ashley & Ashley

ATTORNEYS

:::
United States Patent Office 2,935,195
Patented May 3, 1960

2,935,195
WATER FILTERS

Wilbur L. Dunn, Tulsa, Okla., assignor to National Tank Company, Tulsa, Okla., a corporation of Nevada Application November 13, 1956, Serial No. 621,556

10 Claims. (Cl. 210—104)

This invention relates to new and useful improvements in water filters.

There are various types of petroleum well flow streams which contain water and oil, and in addition, various particles of foreign matter which tend to become wetted with the oil which is present rather than the water. After separation of the oil and water for commercial recovery of the oil, these particles are retained in the water phase, and this water must be disposed of in some suitable manner, often by pumping into a disposal well, or more desirably, by utilization as a water flood for increasing the oil productivity of the petroleum wells, a practice now being carried out on a rather extensive scale. The particles of foreign matter present in the water, however, are troublesome in that they tend to clog the formations of disposal wells or water injection wells, and further, being wetted with oil, their outright disposal in any manner represents an economic loss due to the small but appreciable quantities of oil carried therewith.

It has been the practice to pass this separated water, containing the particles of foreign matter, through a filter vessel of some sort for removal of the particles and for some degree of coalescing of oil therefrom. Such vessels, however, have not been as effective heretofore as might be desired in that they are of limited capacity and limited ability for effective and efficient coalescing of oil from the oil wetted particles. As is true with most types of filtering vessels, back washing of the filter or filter bed must be carried out from time to time to remove accumulated particles therefrom and restore the filter or filter bed to maximum effectiveness. A vessel of sufficient volume, however, to provide a long enough time of residence for the water being treated to be effectively rid of particles of foreign matter as well as to coalesce and collect the oil present on said particles, is very difficult to back wash by reason of its considerable volume. Necessarily a certain minimum velocity of flow for the back wash water is required if effective revivification of the bed is to be achieved, and a large volume vessel accordingly requires a very large back wash pump, and the expense involved in such an installation is not justified. Accordingly, it has been the practice to maintain filter vessels of limited or relatively small internal volume so that a back wash pump of reasonable cost and size may be employed. Nevertheless, more effective treatment of the water and more complete recovery of oil may be achieved in a larger vessel.

It is, therefore, one object of this invention to provide an improved water filter vessel having therein a filter or filter bed which may be back washed in parts or in portions whereby a relatively small pump for back wash water may be employed without sacrificing effective cleaning and back washing of the filter or filter bed.

A particular object of the invention is to provide a water filter of the character described which may be effectively embodied in an elongate horizontal vessel wherein very effective and complete removal of particles of foreign matter from the water stream may be obtained, and more particularly, in which relatively complete coalescing of oil from the particles may be carried out followed by collection and recovery of this oil.

Yet another object of the invention is to provide an improved water filter structure which may be incorporated into either a vertical or a horizontal vessel with provision for selective back washing of a single portion or part of a filter or filter bed at one time, reducing the sizes of pump and other equipment which must be provided, and wherein the back wash water from one portion of the filter or filter bed is excluded from other portions not being back washed at that time, so that effective and orderly back washing of the several filter or filter bed portions may be carried out consecutively for thorough cleansing of the filter structure in an efficient manner.

A construction designed to carry out the invention will be hereinafter described, together with other features of the invention.

Figure 6:
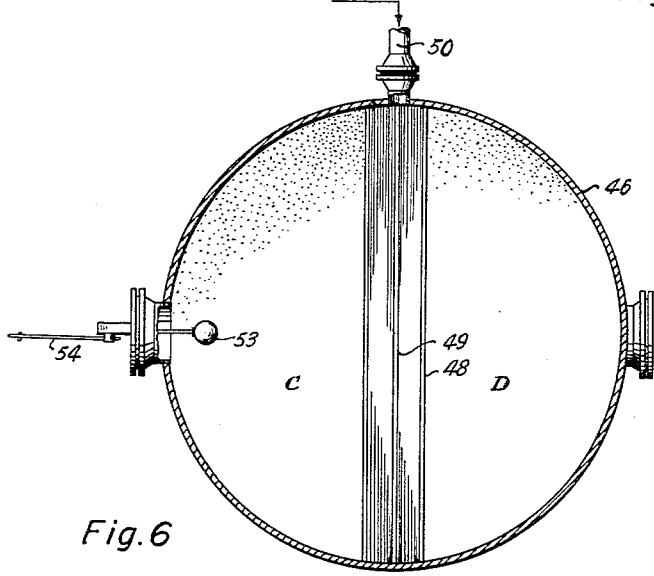

The invention will be more readily understood from a reading of the following specification and by reference to the accompanying drawings, wherein examples of the invention are shown, and wherein:

Fig. 1 is a vertical, longitudinal, sectional view of a horizontal filter tank constructed in accordance with this invention, Fig. 2 is a vertical, cross-sectional view taken upon the line 2—2 of Fig. 1, Fig. 3 is a plan view of the outlet end of the vessel showing the piping arrangement, Fig. 4 is a plan view of the inlet end of the vessel showing the piping arrangement, Fig. 5 is a vertical, cross-sectional view of a vertical water filter vessel constructed in accordance with this invention, and Fig. 6 is a horizontal, cross-sectional view taken upon the line 6—6 of Fig. 5.

In the drawings, the numeral 10 designates an elongate horizontal tank or vessel having its inlet end closed by a dished head 11 and its outlet end closed by a similar dished head 12. The tank is carried upon suitable legs or supports 13 and is provided about its medial portion with a plurality of access openings or manways 14. A vertical partition 15 divides the vessel 10 into compartments A and B by extending throughout the length of the vessel from the bottom wall thereof to a point slightly above the longitudinal axis of the vessel, and carries upon its upper edge an open top trough 16 having upstanding side walls 17. A narrow upstanding plate or baffle 16' extends lengthwise of the trough 16 and has its lower edge provided with notches or openings 17' and its upper edge disposed above the upper edges of the side walls 17. A water inlet pipe 18 opens into the vessel through the head 11, and as shown in Fig. 2, discharges into the trough 16. A water inlet conductor 19 is connected to the pipe 18 through a valve 20 and T 21, and a back wash water outlet conductor 22 is connected into the other leg of the T 21 through a valve 23. Thus, when the valve 23 is closed and the valve 20 is open, water for treating or filtering may be directed into the vessel through the pipes 18 and 19 so as to flow into the trough 16 and be distributed throughout the vessel.

There is provided in the lower portion of the vessel a perforated grating or support plate 24 extending horizontally of the vessel and throughout the length thereof on both sides of the vertical partition 15. A suitable filter bed is supported upon the plates 24 and may be formed of various filtering materials such as coarse sand and gravel, coarsely ground anthracite coal which is employed as a filter medium, or any of the other various and well known filter bed materials. In most instances, it is desirable to form the bed in two layers, an upper layer 25 of a finer filter media and a lower bed 26 of a coarser filter media. Other filter materials which may be employed are the commercial products known as Graphilter and Anthrafilt. Graphilter is a rocky graphite ore, and Anthrafilt is composed of particles of anthracite coal. The bed is desirably built up to a level spaced slightly below the bottom of the trough 16, and, of course, extends from end to end of the vessel 10.

For discharging water from the two halves or longitudinal sections A and B into which the vessel is divided by the partition 15, a water outlet pipe 27 is connected into the bottom of the vessel near the head 12 and beneath the section A but positioned closely to the partition 15. A similar water outlet pipe 28 leads from the lower portion of the portion or compartment B adjacent the head 12, and cut-off valves 29 and 30 are provided in the outlet pipes 27 and 28, respectively. The pipe 28 is connected through the valve 30 to a T 31 which also receives a back wash water inlet pipe 32 having therein a valve 33, and one leg of a second T 34. The water outlet pipe 27 is connected into another leg of the T 34, and a water discharge pipe 35 leads from the T 34 to a cut-off valve 36 and a float-controlled discharge valve 37. A float 38 is mounted in a suitable fixture 39 provided in the upper portion of the head 12 and operates an external lever 40 connected to the lever 41 of the valve 37 by a link or rod 42. As shown in Fig. 1, the float 38 is positioned near the upper wall of the vessel 10, and desirably, this float is of the interface type which responds to the interface between water and oil strata.

For discharging accumulated oil from the vessel 10, an oil outlet pipe 43 extends from the upper wall thereof through an automatic oil discharge valve 44 of the type responsive to pressure within the vessel 10 to open and discharge oil therefrom. The float 38, of course, responds to the oil-water interface 45 and functions to open and close the valve 37 to maintain the oil-water interface at a substantially constant level within the filter vessel.

In the operation of this form of the invention, water enters the vessel 10 through the pipe 18, the valves 23 and 33 being closed, and the valves 20, 29, 30 and 36 being open. Even though the vessel 10 is full of liquid, the incoming water stream will be distributed throughout the length of the vessel in the trough 16 and will flow over the side walls 17 thereof into the vessel proper. Sand, oil-wetted particles of foreign material, and the like, will settle onto the filter bed, and since the water outlets are beneath the filter bed, all water discharged will ultimately flow through the bed. Within the bed, the particles of foreign material are trapped, and by prolonged retention in the bed, the oil coating these particles will coalesce into drops and droplets of sufficient size as to gravitate upwardly into the upper portion of the vessel 10. The elongate horizontal structure of the vessel insures a long period of residence or retention time within the vessel for water being passed therethrough, and hence, the rate of flow of the water through the filter bed is very moderate and ample time and opportunity is given for removal of all foreign particles, as well as for the coalescing of the oil with which these particles are often wetted. Hence, a very effective and efficient filtering operation is carried out, and at the same time, the velocity of flow through the bed is sufficiently low as to permit the coalescing and separation by difference in density of oil which may be trapped in the filter bed in relatively small quantities as coatings upon the numerous small particles of foreign material.

As water accumulates within the vessel, pressure will be exerted upon the automatic valve 44 causing it to open and discharge oil through the outlet pipe 43. As the water level rises, however, the float 38 will be elevated, opening the valve 37 and discharging clean filtered water from the tank. The two outlets operate in conjunction to discharge oil at approximately the rate it accumulates, to discharge water in the same manner, and to maintain the oil-water interface 45 at a fairly constant level or elevation within the vessel.

After extended use and the trapping of quantities of foreign material in the filter bed, back washing of the bed becomes necessary or advisable, and is carried out by closing of the valves 20 and 36 and either of the valves 29 or 30. Back wash water under pressure is supplied from a pump or other suitable means (which is not shown) through the pipe 32, and the valves 33 and 23 may be opened, along with the valve 29 to direct the wash water upwardly through that portion of the filter bed present in the compartment A. The back wash water rises through the filter bed and overflows the side wall 17 within the chamber A to enter the trough 16 and be discharged through the pipe 18, the valve 23, and the back water discharge pipe 22. The notches 17′ permit the back wash water to utilize the entire width of the trough 16, and at the same time, the upstanding partition 16′ prevents the back wash water from flowing across the trough 16 under the impetus of its velocity and overflowing the opposite side wall 17 into the compartment B.

Since only one-half of the filter bed is back washed at a time, a somewhat smaller back wash pump may be employed, and the necessary velocities of flow of back wash water upwardly through the bed are achieved without requiring excessively large and expensive back wash equipment and the expenditure of the inordinately large quantities of power to drive such equipment.

After the portion of the filter bed in compartment A has been effectively back washed, the valve 29 is closed and the valve 30 is opened to back wash the portion of the filter bed in compartment B. Here again, the back wash water overflows into the trough 16 and is withdrawn through the outlet pipe 22, there being no contamination of the portion of the filter bed previously back washed so that the filter bed in compartment A remains clean and ready for continued use. Of course, when back washing of both sections has been completed, the valves 33 and 23 are closed, both valves 29 and 30 are opened, and the valves 20 and 36 are opened for the filtering of further quantities of water.

It is quite obvious that various manifolding arrangements for the two water outlets and the back wash water inlet may be provided, separate back wash water inlets into the vessel 10 may be employed, and other conventional and apparent modifications may be made. Further, the interior of the vessel 10 may be divided into any desired number of filter sections by additional longitudinal partitions, similar to the partition 15, as well as by transverse vertical partitions dividing the vessel lengthwise into a number of filter sections.

In the form of the invention shown in Figs. 5 and 6, a vertical vessel 46 is utilized, the vessel being divided in its lower portion into sections C and D by a vertical partition 47 carrying a diametric trough 48 and a relatively narrow, notched plate 49 extending longitudinally and medially of the trough 48. A water inlet conductor 50 leads into the vessel to one end of the trough 48, and water outlet conductors 51 and 52 are provided for the sections C and D into which the vertical partition 47 divides the vessel 46. A float 53 is provided in the upper portion of the vessel 46 and operates an external lever 54 for controlling a water discharge valve (not shown) through which the outlet pipes 51 and 52 are connected to a common water discharge pipe (not shown).

Perforated, horizontal support plates 55 extend across the lower portions of the compartments C and D and support filter beds 56 in the manner described in conjunction with the first form of the invention. Thus, it will be seen that the vertical modification of the invention is very similar to, and is substantially identical in many respects with the form of the invention shown in Figs. 1–4. The operation of this second form of the invention is, of course, the same as for the first form of the invention, the float 53 maintaining the oil-water interface 57 at a substantially constant level within the vessel 10, and accumulated oil being discharged through the outlet pipe 58 as it is separated and collected within the filter vessel. Here again, the filter bed is divided into two portions for effective back washing with back washing equipment of moderate volume capacity, and at the same time, the advantages and benefits of a filter bed of large volume and expanse are realized.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A water filter structure including, a closed vessel, a vertical partition in the lower portion of the vessel dividing the lower portion of the vessel into at least two compartments and terminating short of the upper wall of the vessel, filter beds in the compartments, water outlet conductors from the compartments, valves in the water outlet conductors, a horizontal water distribution trough on the upper edge of the partition and spaced below the upper wall of the vessel, a water inlet conductor leading to the trough, and valves for controlling the flow of water through the vessel in one direction for filtering and the flow of back wash water through the compartments separately in the opposite direction.

2. A water filter structure including, an elongate closed horizontal vessel, a vertical partition in the lower portion of the vessel dividing the lower portion of the vessel into at least two compartments and terminating short of the upper wall of the vessel, filter beds in the compartments, water outlet conductors from the compartments, valves in the water outlet conductors, a horizontal water distribution trough on the upper edge of the partition and spaced below the upper wall of the vessel, a water inlet conductor leading to the trough, and valves for controlling the flow of water through the vessel in one direction for filtering and the flow of back wash water through the compartments separately in the opposite direction.

3. A water filter structure including, an elongate closed horizontal vessel, a vertical partition in the lower portion of the vessel dividing the lower portion of the vessel longitudinally into at least two compartments and terminating short of the upper wall of the vessel, filter beds in the compartments, water outlet conductors from the compartments, valves in the water outlet conductors, a horizontal water distribution trough on the upper edge of the partition and spaced below the upper wall of the vessel, a water inlet conductor leading to the trough, and valves for controlling the flow of water through the vessel in one direction for filtering and the flow of back wash water through the compartments separately in the opposite direction.

4. A water filter structure including, an elongate closed horizontal vessel, a vertical partition in the lower portion of the vessel dividing the lower portion of the vessel longitudinally into at least two compartments and terminating short of the upper wall of the vessel, filter beds in the compartments, water outlet conductors from one end of the compartments, valves in the water outlet conductors, a horizontal water distribution trough on the upper edge of the partition and spaced below the upper wall of the vessel, a water inlet conductor leading to that end of the trough opposite the ends of the compartments from which the water outlet conductors lead, and valves for controlling the flow of water through the vessel in one direction for filtering and the flow of back wash water through the compartments separately in the opposite direction.

5. A water filter structure as set forth in claim 1, and an oil outlet conductor leading from the upper portion of the vessel.

6. A water filter structure as set forth in claim 5, an automatic back-pressure oil discharge valve in the oil outlet conductor, a float-controlled valve for controlling water discharge through the water outlet conductors, and an oil-water interface float in the upper portion of the vessel operatively connected to the float-controlled valve.

7. A water filter structure including, a closed vessel, a vertical partition in the lower portion of the vessel dividing the lower portion of the vessel into at least two compartments and terminating short of the upper wall of the vessel, filter beds in the compartments, water outlet conductors from the compartments, valves in the water outlet conductors, a horizontal water distribution trough on the upper edge of the partition and spaced below the upper wall of the vessel, a water inlet conductor leading to the trough, a short vertical plate extending medially and longitudinally of the trough, and valves for controlling the flow of water through the vessel in one direction for filtering and the flow of back wash water through the compartments separately in the opposite direction.

8. A water filter structure including, a closed vessel, a vertical partition in the lower portion of the vessel dividing the lower portion of the vessel into at least two compartments and terminating short of the upper wall of the vessel, filter beds in the compartments, water outlet conductors from the compartments, valves in the water outlet conductors, a horizontal water distribution trough on the upper edge of the partition and spaced below the upper wall of the vessel, a water inlet conductor leading to the trough, a short vertical plate extending medially and longitudinally of the trough, said plate having its upper edge disposed above the marginal edges of the trough, and valves for controlling the flow of water through the vessel in one direction for filtering and the flow of back wash water through the compartments separately in the opposite direction.

9. A water filter structure including, a closed vessel, a vertical partition in the lower portion of the vessel dividing the lower portion of the vessel into at least two compartments and terminating short of the upper wall of the vessel, foraminous support plates in the lower portions of the compartments overlying filtered water collection spaces, filter beds in the compartments carried on the support plates, water outlet conductors from the compartments, valves in the water outlet conductors, a horizontal water distribution trough on the upper edge of the partition and spaced below the upper wall of the vessel, a water inlet conductor leading to the trough, and valves for controlling the flow of water through the vessel in one direction for filtering and the flow of back wash water through the compartments separately in the opposite direction.

10. A water filter structure including, a closed vessel, a vertical partition in the lower portion of the vessel dividing the lower portion of the vessel into at least two compartments and terminating short of the upper wall of the vessel, filter beds in the compartments, valves in the water outlet conductors, a horizontal water distribution trough on the upper edge of the partition and spaced below the upper wall of the vessel, a water inlet conductor leading to the trough, a short vertical plate extending medially and longitudinally of the trough, said plate having its upper edge disposed above the marginal edges of the trough, and its lower edge provided with a plurality of spaced openings, and valves for controlling the flow of water through the vessel in one direction for filtering and the flow of back wash water through the compartments separately in the opposite direction.

References Cited in the file of this patent

UNITED STATES PATENTS

| Re. 24,275 | Lawlor | Feb. 12, 1957 |
| 538,720 | Allen | May 7, 1895 |
| 862,314 | Decker | Aug. 6, 1907 |
| 2,179,131 | Millard | Nov. 7, 1939 |

FOREIGN PATENTS

| 22,581 | Great Britain | Feb. 1, 1901 |